April 29, 1969 W. R. RANDLE 3,441,840
ELECTRONIC THICKNESS METER HAVING DIRECT READOUT
OF COATING THICKNESS Filed March 31, 1967 Sheet 1 of 4

INVENTOR.
WILLIAM R. RANDLE
BY William M. Hobby
ATTORNEY 3,441,840
ELECTRONIC THICKNESS METER HAVING DIRECT READOUT OF COATING THICKNESS
William R. Randle, Orlando, Fla., assignor to Martin-Marietta Corporation, New York, N.Y., a corporation of Maryland
Filed Mar. 31, 1967, Ser. No. 627,435
Int. Cl. G01r 33/00
U.S. Cl. 324—34                                    4 Claims

ABSTRACT OF THE DISCLOSURE

The present invention involves a device for measuring the thickness of nonconductive coatings on conductive surfaces using a bridge circuit with a pair of inductive coil probes connected across legs of the bridge circuit. The bridge circuit is balanced with one probe placed on a nonconductive coating to be measured and the other probe, which has a built in micrometer for varying the distance the coil is from a surface, placed on a reference conductive surface similar to the conductive surface under the nonconductive coated surface being measured. The unknown coating thickness may then be read directly from the micrometer scale on the probe having the micrometer.

BACKGROUND OF THE INVENTION

Field of the invention

The present invention relates to a thickness meter and more particularly to an electronic thickness meter for measuring nonconductive coatings on conductive surfaces.

The present invention comprises a reactive component bridge circuit which includes a pair of inductive coils connected across legs of the bridge. A high frequency oscillator and associated wave shaper circuitry provide a high frequency square wave input to the bridge. The bridge is tuned with both inductive coils completely free of the influence of any conductive material in order to provide a minimum voltage output across the bridge. A differential amplifier is connected across the bridge to produce a null reading on an output microammeter when there is a minimum voltage output from the bridge. When one of the inductive coils is near a nonconductive coated conductive surface, it will produce a phase and amplitude change in the signal from its respective leg of the bridge which will be indicated by the microammeter.

The remaining inductive coil is provided with a micrometer probe and is adjusted normal to the surface of an uncoated reference material until a null is again obtained from the microammeter. The unknown coating thickness may then be read directly from the micrometer scale on the reference inductive probe. The present invention will advantageously measure within close tolerances relatively thick coating over conductive surfaces without the use of calibration curves or calibration scales for each conductive surface.

DESCRIPTION OF PRIOR ART

In the past, nondestructive one-sided measurement of paint coatings, and the like, have been available. One such device uses a single probe and operates on magnetic influence of any conductive material in order to provide metals having substantially nonmagnetic coatings. Thickness of the surface is measured in accordance with the magnetic pull of the probe, which incorporates either a permanent magnet or an electromagnet of some type. These prior art devices are incapable of measuring coatings over nonmagnetic metals and require calibration curves and are not accurate over relatively thick coatings such as ablatives for missile nose cones.

A second class of measurement devices can be used on coated nonmagnetic metals and utilizes bridge circuits with a single probe connected across one leg of the bridge circuit. These devices require either a comparison of their readout with calibration curves for different metals and alloys, or a meter that can adjust its readout scales for each metal alloy used. These devices have not been found to have a high accuracy for very thick coating and their accuracy is affected by the shape of the metal base being measured and either must be adjusted or compared with a calibration curve for each variation in the metals or metal alloys used.

Finally, a prior art device has been suggested for measuring thicknesses of magnetizable plated sheets by employing a reference gauging magnetic head measuring a reference sheet of metal and a second magnetic gauge head for measuring a sheet of unknown thickness. This device works only on magnetic metals and is not used for measuring coatings over metals. This device would not be suitable for measuring relatively thick coatings.

BRIEF DESCRIPTION OF THE DRAWINGS

Other objects, features, and advantages of this invention will be apparent from a study of the written description and the drawings in which.

DESCRIPTION OF THE PREFERRED EMBODIMENTS

Figure 1:
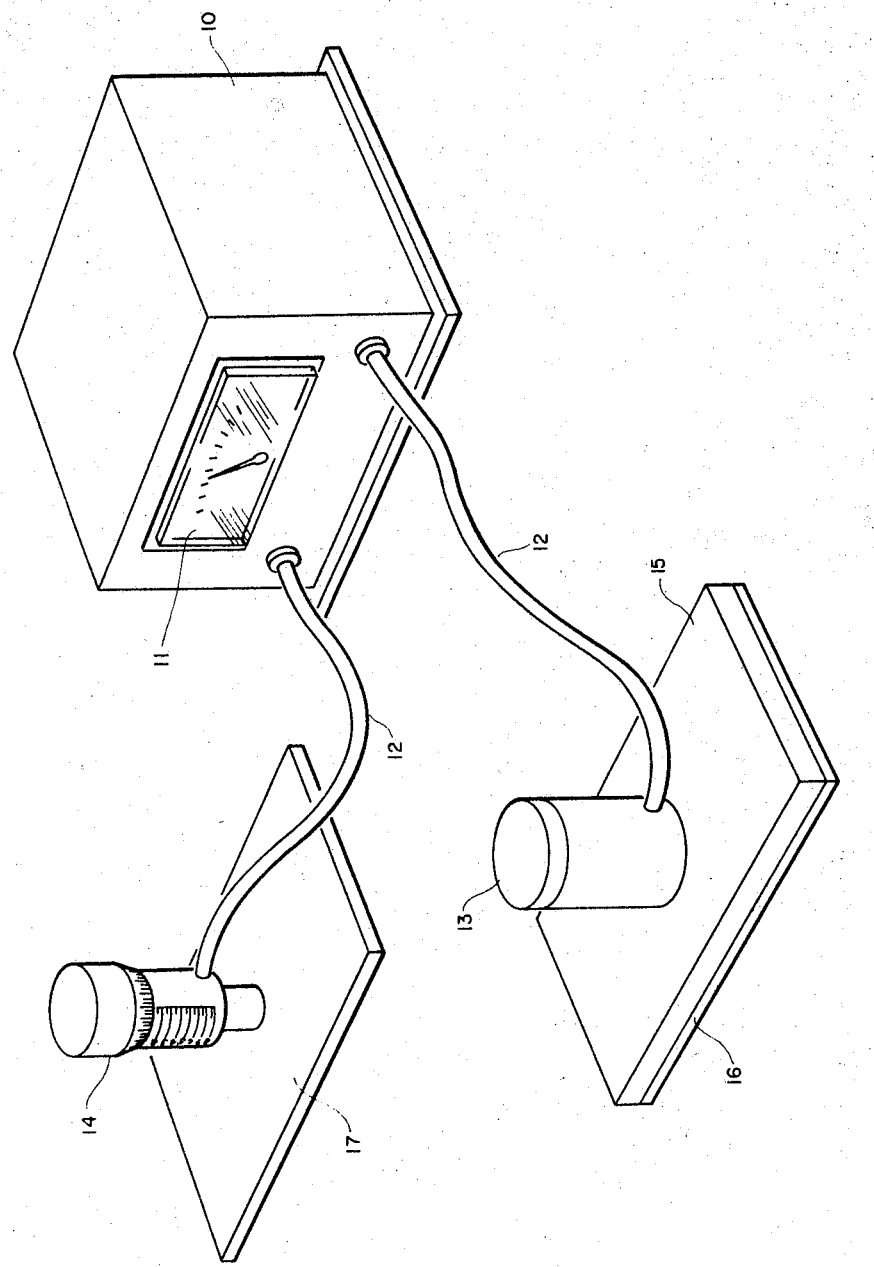
FIGURE 1 is a perspective view of the present invention.

FIGURE 1 shows an exterior view of the present invention with an instrument case 10 which has a meter 11 and two coaxial cables 12 leading therefrom. One coaxial cable is connected to a fixed probe 13 while the other coaxial cable is connected to a micrometer probe 14. The fixed probe 13 is placed upon a substantially nonconductive coating 15 on a conductive base 16. The micrometer probe 14 is placed upon a reference conductive surface 17 which is ideally the same as the base 16.

In operation, once the instrument is turned on, the micrometer probe 14 is adjusted to obtain a null reading on the meter 11. At this point the micrometer on the micrometer probe 14 can be read to give the thickness of the coating 15 since each probe should be the same distance from their respective conductive bases 16 and 17.

Figure 2:
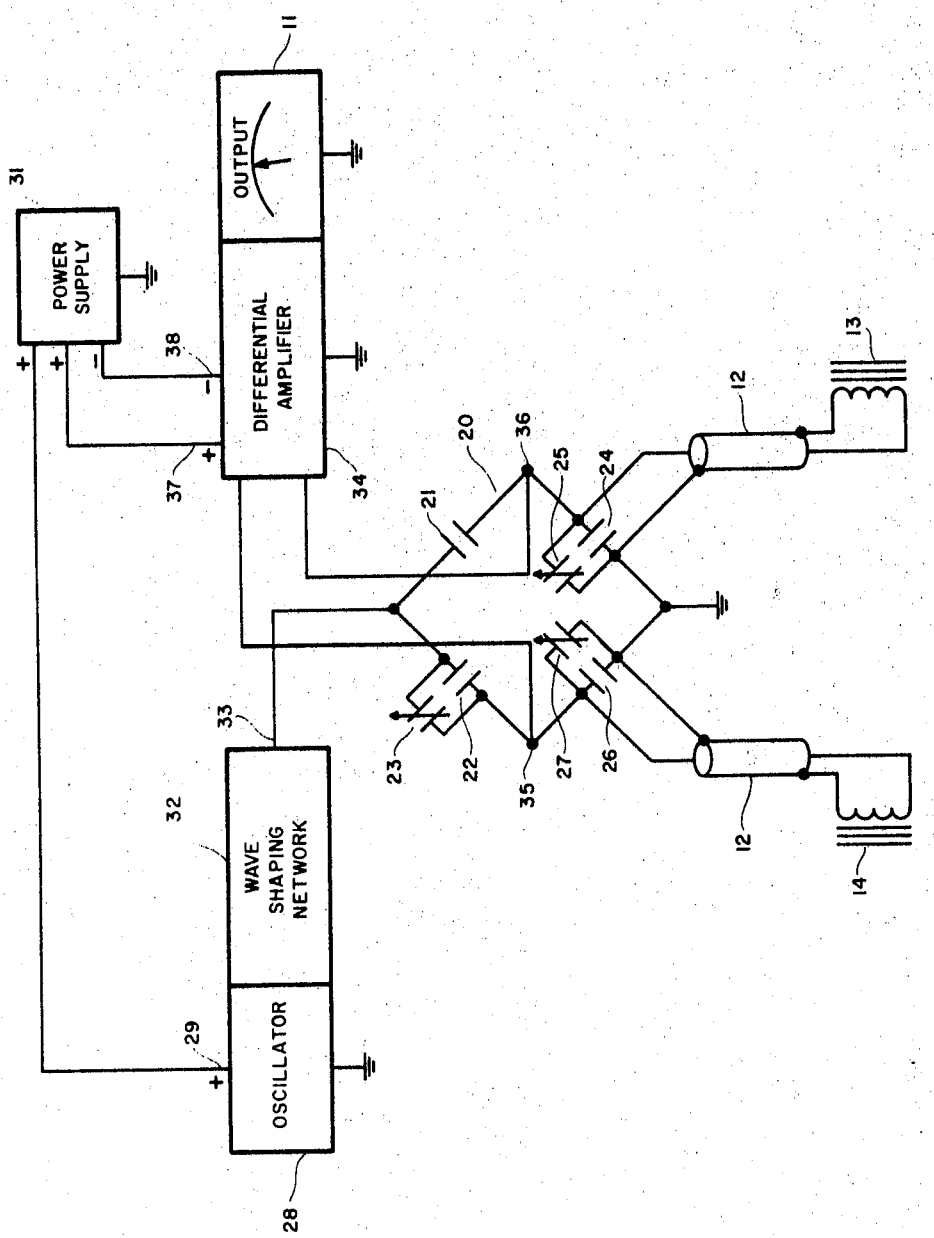
FIGURE 2 is a block and schematic diagram of one embodiment of the present invention.

Turning now to FIGURE 2, a bridge circuit 20 has four legs each with a reactive element or elements therein. Capacitor 21 makes the reactance for one leg and is balanced with respect to the leg containing parallel capacitors 22 and capacitor 23. Capacitor 23 is a trimmer capacitor for adjusting the capacitance in capacitors 22 and 23 to match that of capacitor 21. This is done because of the difficulty in practice of obtaining closely matched capacitors. A third leg has a capacitor 24 with a trimmer capacitor 25 connected in parallel for close adjustments, and the last leg of the bridge circuit 20 has a capacitor 26 and trimmer capacitor 27 respectively matching capacitors 24 and 25. Inductance probe 14 is connected in parallel with capacitors 26 and 27 and probe 13 is connected in parallel with capacitors 24 and 25. Inductance probes 13 and 14 have closely matched inductances so that the bridge circuit can be maintained in an initially balanced condition.

An oscillator 28 which may be crystal controlled to provide the necessary frequency stability has DC voltage input 29 from a power supply 31 and produces a sine wave to the wave shaping network 32. The shaping network 32 changes the sine wave input into a square wave which desirably should have a constant amplitude and good frequency stability for a sharply tuned bridge circuit. This circuit 32 also may be used to divide the sine wave frequency from the oscillator 28 to a lower frequency and must produce a low source impedance at its output 33 to avoid being loaded when the bridge changes impedance during a measurement. While any number of wave shaping circuits may be used, I have found that the following well known circuits connected in tandem produce a desirably shaped wave output. A Schmitt trigger is connected to a bistable multivibrator connected to a differentiating circuit connected to a bistable multivibrator which is finally connected to a clamping circuit. The Schmitt trigger produces a desirable sharpness in the rise and decay in the signal output of the oscillator, while the first bistable multivibrator divides the frequency by two while producing a pulsed output to the differentiating circuit which changes the square wave input into a spike wave for triggering the second bistable multivibrator. The second bistable multivibrator again divides the signal by two and produces a pulsed output to a clamping circuit which produces the low-source impedance while assuring a constant amplitude to the output 33. It should be noted at this point that while a circuit producing a square wave output has been found preferable, the present invention works with other shaped waves such as a sine wave, and is not to be considered or limited to any particular shape.

The signal source or signal generator consisting of the oscillator 28 and wave shaping networks 32 directly affects the selection of the birdge circuit 20 components since they must be selected in accordance with the frequency input to the bridge circuit. Accordingly, any signal source may be used with the present circuit provided it produces a uniform wave preferably with a constant amplitude and low impedance output. However, it is desirable to select an output frequency, such as 25 kc. which will keep the components of the bridge circuit 20 to a reasonable size.

The square wave output from the output 33 of the wave shaping networks 32 is coupled to ground through the bridge ciruit 20. A differential amplifier 34 is connected across the bridge circuit at 35 and 36 to amplify a voltage differential when the bridge is out of balance. The differential amplifier has inputs 37 and 38 for receiving DC voltages from the power supply 31, and includes error amplification stages for producing signals of sufficient magnitude for the DC microammeter 11.

The differential amplifier 34 desirably has a common mode rejection ratio on the order of 5,000 to 1. Thus, inputs which are alike in phase and amplitude will produce a minimum output, while any difference between the two will be greatly amplified.

The present invention takes advantage of the characteristic of an induction coil carrying an alternating current to change its inductance as it is moved closer to a conductive material. This change in inductance is the result of increased eddy current losses in the conductive material as it intercepts more and more lines of the coil's AC field. In practice, the bridge circuit 20 is tuned with both induction coils completely free of the influence of any conductive material in order to provide a minimum voltage output between points 35 and 36 of bridge 20. The fixed coil 13 or probe is placed upon a nonconductive coating of a conductive surface and the micrometer probe 14 is placed upon a reference piece of conductive material. The oscillator 28 and wave shaping network 32 then supplies a square wave signal to the bridge 20. As soon as one of the coils is placed near the conductive material, its characteristics change, producing a phase and amplitude change in the signal that the differential amplifier 34 receives. The differential amplifier 34 will produce an output dependent upon the degree of change which will be related to the distance probes 13 and 14 are from their respective conductive surfaces and will amplify the error signal and deflect the scale of meter 11 upscale or out of the null position. The micrometer probe 14 is next adjusted until the scale of meter 11 reads null again, at which point the coils in the probes 13 and 14 will be the same distance from the nonconductive surfaces. The micrometer probe 14 can then be read to determine the thickness of the nonconductive coating on the conductive surface. This operation is contingent upon conductive materials for each probe being alike in alloy, thickness, and curvature. In practice, it is usually found that an uncoated surface waiting to be coated can be used as a reference for measuring the coating on another similar surface. However, it has also been found that in large circular surfaces that the curvature approaches a flat surface for purposes of the present measurements.

While not wishing to be limited to any particular circuit values, the following set of representative values have been found suitable in this invention, but these are not to be construed as limiting the present invention in any way. These values are based upon an oscillator 28 producing a 100 kc. sine wave signal with a 25 kc. square wave output for the wave shaping network:

Capacitor 21—200 mm. farads.
Capacitor 22—150 mm. farads.
Capacitors 23, 25, 27—0–100 mm. farads.
Capacitors 24, 26—1,700 mm. farads.
Voltages at 37 and 38—+90 volts and −90 volts DC.
Voltage at 29—12 volts DC.
Probes 13 and 14—Coils of #37 insulated copper wire (wound on a powered iron sleeve core) first layer 170 turns, second layer 160 turns, third layer 150 turns, fourth layer 140 turns.

All capacitors are preferably housed in a shielded compartment within the instrument case and the inductor coils contained in molded plastic housings.

Figure 3:
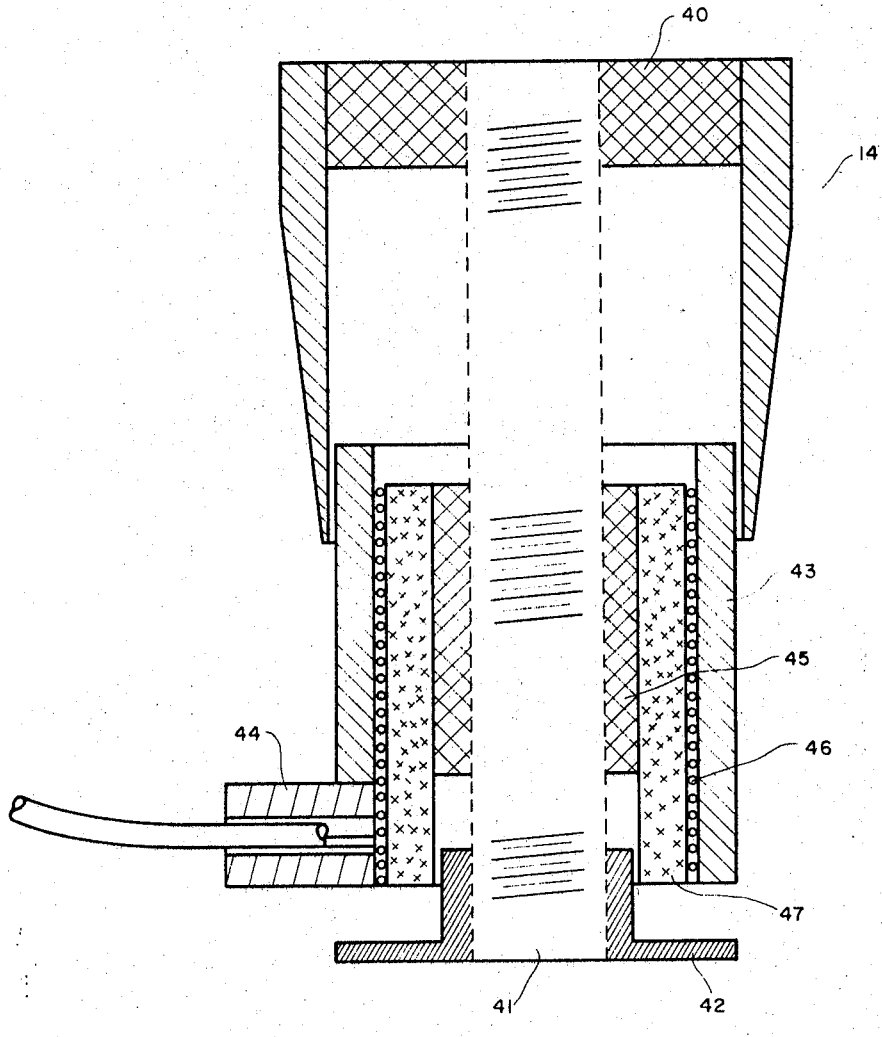
FIGURE 3 is a cutaway view of a measuring probe for the present invention.
Figure 4:
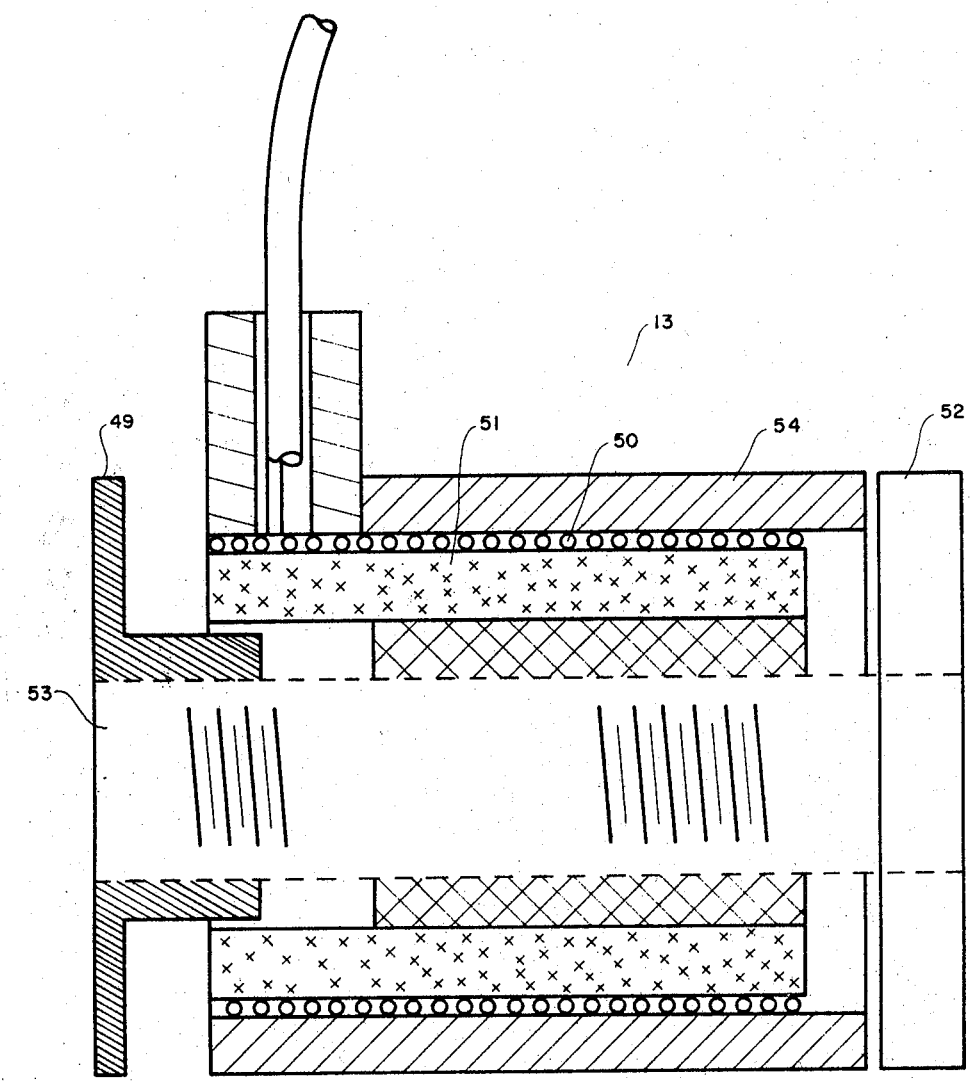
FIGURE 4 is a cutaway view of a fixed probe for the present invention.

Referring now to FIGURES 3 and 4 a more detailed understanding of the probes 13 and 14 may be obtained. FIGURE 3 is a cutaway of the micrometer probe 14 and and has a micrometer thimble 40, a movable threaded spindle 41, spindle base 42, sleeve 43 and a cable holder 44, all of which may be made of plastic, or of any nonconductive materials that holds its shape and that can be molded or machined to close tolerances. Sleeve 43 will normally have a scale thereon for reading of measurements. Threaded bushing 45 is preferably made of a self-lubricating plastic or other nonconducting material. The copper wire coils 46 are wound on a core 47 and the coaxial cable 12 is fastened to the cable holder 44. By turning thimble 40 clockwise or counterclockwise, the movable spindle 41 is turned within the bushing 45 to raise or lower the coil 46 and core 47.

In FIGURE 4, the fixed probe is identical to that of FIGURE 3 except that no thimble is needed. The coil 50 and core 51 are raised or lowered for an initial adjustment by turning a cap 52 to rotate the spindle 53. Once the initial adjusting is made to balance one coil probe with the other, the cap 52 is glued to the surface 54. It does not need to be disturbed thereafter.

From the foregoing description, it will be clear that an electronic thickness meter for measuring nonconductive coatings has been provided. The circuit as described has a wide range of uses such as measuring ablative nose cones on missiles or the like, but it is to be understood that other variations are contemplated as being within the spirit of the invention.

This invention is not to be construed as limited to the particular forms disclosed herein, since these are to be regarded as illustrative rather than restrictive.

I claim:
1. An electronic thickness meter for providing a direct thickness readout over a wide range of possible thicknesses of a nonconductive coating on a conductive surface by the use of a pair of electrically similar probes, and a reference conductive surface of comparable electrical characteristics to the coated conductive surface, comprising in combinating, a tuned bridge circuit having a plurality of legs, a crystal oscillator controlled alternating current signal source coupled to said bridge circuit and arranged to impress signals thereacross, null indicator means coupled to said bridge circuit and arranged to indicate when said bridge circuit is balanced, a pair of probes, each forming a part of a respective leg of said bridge circuit, and each including an inductance coil whose inductance value changes as the probe is moved closer to a conductive material, said probes being adapted to be placed upon conductive surfaces, one of which has a coating whose thickness is to be measured, and the other of which is a reference surface, one of said probes being an adjustable probe having an easily read calibrated height adjustment means thereon controlling the distance that its respective inductance coil bears to the reference conductive surface, and enabling such distance to be precisely adjusted, thus to compensate for the thickness of the nonconductice coating on which the other probe rests, whereby after said null indicator means has indicated that by manipulation of said height adjustment means, said bridge has been balanced with said probes in position on the conductive surfaces, the calibrations on said adjustable probe can then be read as an immediate visual indication of the thickness of the nonconductive coating on the conductive surface.

2. A thickness meter according to claim 1 in which said null indicator means includes a microammeter.

3. A thickness meter according to claim 2 in which said null indicator means includes a differential amplifier.

4. A thickness meter according to claim 1 in which said signal source produces square wave signals.

References Cited

UNITED STATES PATENTS

| 1,889,361 | 11/1932 | Hickok | 324—34 |
| 1,989,037 | 1/1935 | Brown | 324—34 |
| 2,503,720 | 4/1950 | Gieseke | 324—34 |
| 2,629,004 | 2/1953 | Greenough | 324—34 |
| 3,252,084 | 5/1966 | Krobath | 324—40 |

FOREIGN PATENTS 898,347    6/1962  Great Britain.

OTHER REFERENCES

Instruments, vol. 24, June 1951, pp. 692 and 694.

RUDOLPH V. ROLINEC, *Primary Examiner.*

R. J. CORCORAN, *Assistant Examiner.*